(12) United States Patent
Pua et al.

(10) Patent No.: US 8,037,233 B2
(45) Date of Patent: Oct. 11, 2011

(54) SYSTEM, CONTROLLER, AND METHOD FOR DATA STORAGE

(75) Inventors: Khein-Seng Pua, Miaoli (TW); Chung-Hsun Ma, Miaoli (TW); Ming-Jen Liang, Miaoli (TW); Cheng-Chi Hsieh, Taipei (TW); Chih-Ling Wang, Miaoli (TW)

(73) Assignee: Phison Electronics Corp., Miaoli (TW)

( * ) Notice: Subject to any disclaimer, the term of this patent is extended or adjusted under 35 U.S.C. 154(b) by 596 days.

(21) Appl. No.: 12/175,731

(22) Filed: Jul. 18, 2008

(65) Prior Publication Data

US 2009/0198877 A1 Aug. 6, 2009

(30) Foreign Application Priority Data

Feb. 5, 2008 (TW) .............................. 97104766 A

(51) Int. Cl.
*G06F 12/00* (2006.01)
(52) U.S. Cl. .................................. 711/103; 365/185.03
(58) Field of Classification Search .................. 711/103; 365/185.03
See application file for complete search history.

(56) References Cited

U.S. PATENT DOCUMENTS

| 5,812,814 | A | 9/1998 | Sukegawa ..................... 395/430 |
| 7,788,553 | B2 * | 8/2010 | Chow et al. .................... 714/718 |
| 2003/0007384 | A1 * | 1/2003 | Shimizu .................... 365/185.03 |
| 2003/0191874 | A1 * | 10/2003 | Drescher et al. ................ 710/38 |
| 2006/0155921 | A1 * | 7/2006 | Gorobets et al. ............. 711/103 |
| 2008/0263259 | A1 * | 10/2008 | Sadovsky et al. ............. 711/100 |
| 2009/0132778 | A1 * | 5/2009 | Danilak ....................... 711/167 |
| 2009/0292859 | A1 * | 11/2009 | Chu et al. ...................... 711/102 |

FOREIGN PATENT DOCUMENTS

KR          100771521          10/2007

* cited by examiner

*Primary Examiner* — Hashem Farrokh
(74) *Attorney, Agent, or Firm* — J.C. Patents

(57) ABSTRACT

A system, a controller, and a method for data storage are provided. The system includes a first storage unit, a second storage unit, and a controller. The first storage unit comprises a single-layer structure for storing data, and the second storage unit comprises a multi-layer structure for storing data. The controller is coupled to the first storage unit, the second storage unit, and a host and controls the host to set the first storage unit as a master storage device and set the second storage unit as a slave storage device. As a result, the host can recognize the first storage unit and the second storage unit as two independent storage devices for storing data. Thereby, the data storage process can be simplified.

21 Claims, 4 Drawing Sheets

SYSTEM, CONTROLLER, AND METHOD FOR DATA STORAGE

CROSS-REFERENCE TO RELATED APPLICATION

This application claims the priority benefit of Taiwan application serial no. 97104766, filed on Feb. 5, 2008. The entirety of the above-mentioned patent application is hereby incorporated by reference herein and made a part of this specification.

BACKGROUND OF THE INVENTION

1. Field of the Invention

The present invention generally relates to a system and a method for data storage, in particular, to a system, a controller, and a method which can control a host to identify storage devices and store data accordingly.

2. Description of Related Art

Along with the development of semiconductor technology, the storage capacities of memories have been greatly increased while the prices thereof are relatively reduced. Flash memory is one of the most adaptable memories for portable products due to its characteristics such as non-volatility, low power consumption, small volume, and non-mechanical structure. Accordingly, a solid state disk (SSD) which uses a NAND flash memory as its data storage medium has been developed in recent years. In a SSD, the mechanical structure of a conventional storage device is replaced by the characteristics of a flash memory, and data is accessed through block writing and erasing. As a result, the access efficiency of SSD can be greatly improved, and compared to a conventional storage device, a SSD is highly resistant to vibration and low temperature and offers low power consumption and high stability.

NAND flash memories can be categorized into single level cell (SLC) NAND flash memory (referred as SLC thereinafter) and multi level cell (MLC) NAND flash memory (referred as MLC thereinafter). A SLC uses a group of high/low voltages for identifying two different electric charges (including 0 and 1), and a MLC uses a higher driving voltage and records two-bit information (including 00, 01, 11, and 10) with voltages of different levels. Accordingly, the density of data recorded in a MLC is two times of that in a SLC. Since a SLC has simple structure and low voltage variation while writing data, the lifespan thereof is relatively long. As to a MLC, in order to increase the recording capacity thereof, the voltage range thereof is smaller and more space for cyclic redundancy check (CRC) is required. Besides, because the voltage changes frequently, a MLC can only be accessed about 10,000 times, which is far less than the 100,000 times of a SLC.

In overview, SLC has advantages in its lifespan and performance but offers low storage capacity and high cost, while MLC is disadvantageous in its speed and lifespan even though it offers high storage capacity. In order to reduce the cost without affecting the performance, conventionally, both a SLC and a MLC are disposed in the same host, wherein the faster SLC is used for recording important and frequently-accessed operating system (OS) information, and the low-cost MLC is used for recording general data files, so that the requirements to low cost and high performance can be both met.

In order to prolong the lifespan of a SSD, how to effectively manage the blocks for writing data so that the SLC and the MLC can have the optimized efficiency has become one of the most important subjects in the industry. However, in an existing product disposed with both a SLC and a MLC, a host can only treat the two storage devices as a single storage device but cannot recognize them as two different storage devices (for example, as drive C and drive D). Accordingly, the management of data writing is complicated.

SUMMARY OF THE INVENTION

Accordingly, the present invention is directed to a data storage system, wherein an independent controller is disposed in a storage device to obtain information of the storage device in advance and control a host to identify a single level cell (SLC) NAND flash memory and a multi level cell (MLC) NAND flash memory as two different storage devices, so as to increase the convenience of data management.

The present invention is also directed to a data storage method, wherein a SLC and a MLC are set in a host as storage devices corresponding to the types thereof, and while writing data, the data is stored into an appropriate storage device according to the attribute of the data, so as to increase the efficiency of data reading.

The present invention provides a data storage system, which includes a first storage unit, a second storage unit, and a controller. The first storage unit comprises a single-layer structure for recording data, and the second storage unit comprises a multi-layer structure for recording data. The controller is respectively coupled to the first storage unit, the second storage unit, and a host and informs the host that the first storage unit is a master storage device and the second storage unit is a slave storage device.

According to an embodiment of the present invention, the controller responds the host with a proprietary command or a vendor specific command to allow the host to identify the first storage unit and the second storage unit.

According to an embodiment of the present invention, the first storage unit and the second storage unit respectively store system information, and the controller identifies the storage structure type of a storage device coupled thereto according to the system information provided by the storage device and accordingly sets the storage device as a master storage device or a slave storage device.

According to an embodiment of the present invention, the controller further receives and identifies data transmitted by the host, wherein when the data is identified as a first type of data, the controller sends the data to the first storage unit, and when the data is identified as a second type of data, the controller sends the data to the second storage unit. The first type of data includes operating system (OS) information, and the second type of data includes data files. In addition, according to anther embodiment of the present invention, the first type of data includes marked to send to the master storage device, and the second type of data includes data marked to send to the slave storage device.

According to an embodiment of the present invention, the first storage unit is a physical SLC flash memory, and the second storage unit is a physical MLC flash memory.

According to an embodiment of the present invention, the first storage unit and the second storage unit may be formed by partitioning a physical storage device, wherein the first storage unit is a first logic address section of the storage device, and the second storage unit is a second logic address section of the storage device.

According to an embodiment of the present invention, the controller reads information of the first logic address section and the second logic address section from the storage device when the host is in operation and accordingly sets the first logic address section of the storage device as the master storage device and sets the second logic address section of the storage device as the slave storage device. The storage device is a MLC flash memory, the first logic address section uses only lower pages for storing data, and the second logic address section uses both lower pages and upper pages for storing data.

According to an embodiment of the present invention, the controller is connected to the host through a parallel advanced technology attachment (PATA) interface or a serial advanced technology attachment (SATA) interface.

According to an embodiment of the present invention, a partition information block in the first storage unit and the second storage unit is write protected, and the first storage unit and the second storage unit are integrated into or packaged as an apparatus.

The present invention provides a data storage system including a first storage unit, a second storage unit, a first controller, and a second controller. The first storage unit comprises a single-layer structure for storing data, and the second storage unit comprises a multi-layer structure for storing data. The first controller is coupled to the first storage unit and a host for setting the first storage unit as a master storage device. The second controller is coupled to the second storage unit and the host for setting the second storage unit as a slave storage device.

According to an embodiment of the present invention, the first controller and the second controller respond the host with a proprietary command or a vendor specific command to allow the host to identify the first storage unit and the second storage unit.

According to an embodiment of the present invention, the first controller receives and identifies data transmitted by the host, wherein when the data is identified as a first type of data, the first controller sends the data to the first storage unit. The second controller receives and identifies data transmitted by the host, wherein when the data is identified as a second type of data, the second controller sends the data to the second storage unit. The first type of data includes OS information, and the second type of data includes data files. According to another embodiment of the present invention, the first type of data includes data marked to send to the master storage device, and the second type of data includes data marked to send to the slave storage device.

According to an embodiment of the present invention, the first storage unit is a SLC flash memory, and the second storage unit is a MLC flash memory. The first controller and the second controller are connected to the host through a PATA interface or a SATA interface.

According to an embodiment of the present invention, the first storage unit and the second storage unit are both MLC flash memories, wherein the first storage unit uses only lower pages for storing data, and the second storage unit uses both lower pages and upper pages for storing data.

According to an embodiment of the present invention, the first controller and the second controller are integrated or packaged as into an apparatus. According to another embodiment of the present invention, the first controller, the second controller, and the first storage unit are integrated into or packaged as an apparatus.

According to an embodiment of the present invention, the first storage unit and the second storage unit are integrated into or packaged as an apparatus.

The present invention provides a data storage method suitable for storing data into a first storage unit or a second storage unit, wherein the first storage unit comprises a single-layer structure for recording data, and the second storage unit comprises a multi-layer structure for recording data. The data storage method includes following steps. First, the first storage unit and the second storage unit are connected to the host. Next, the first storage unit and the second storage unit are identified by a controller to obtain identification information. Thereafter, the first storage unit is set as a master storage device and the second storage unit is set as a slave storage device according to the identification information.

According to an embodiment of the present invention, the step of controlling the host to set the master storage device and the slave storage device by using the controller includes responding the host with a proprietary command or a vendor specific command so as to control the host to set the first storage unit and the second storage unit and allow the host to identify the first storage unit and the second storage unit.

According to an embodiment of the present invention, the identification information refers to that the controller identifies the storage structure type of a storage device coupled thereto and accordingly sets a storage device having a single-layer structure as a master storage device and sets a storage device having a multi-layer structure as a slave storage device.

According to an embodiment of the present invention, the data storage method further includes receiving data transmitted by the host and identifying the type of the data by using the controller, so as to transmit the data accordingly, wherein when the data is identified as a first type of data, the controller sends the data to the first storage unit, and when the data is identified as a second type of data, the controller sends the data to the second storage unit. The first type of data includes OS information, and the second type of data includes data files. According to another embodiment of the present invention, the first type of data includes data marked to send to the master storage device, and the second type of data includes data marked to send to the slave storage device.

According to an embodiment of the present invention, the first storage unit and the second storage unit may be formed by partitioning a physical storage device, and the step of identifying the first storage unit and the second storage unit by using the controller so as to obtain the identification information is to read a partition information block of the storage device to obtain information of a first logic address section and a second logic address section and use them as the identification information, wherein the first storage unit is the first logic address section of the storage device, and the second storage unit is the second logic address section of the storage device. The first logic address section uses only lower pages for storing data, and the second logic address section uses both lower pages and upper pages for storing data.

The present invention provides a controller suitable for a first storage unit and a second storage unit. The controller includes a host connecting interface, a microprocessor unit, a master non-volatile memory interface, a slave non-volatile memory interface, and a memory management unit. The host connecting interface is coupled to a host unit. The microprocessor unit controls the operation of the controller. The master non-volatile memory interface is electrically connected to the microprocessor unit and is used for accessing the first storage unit, wherein the first storage unit comprises a single-layer structure for storing data. The slave non-volatile memory interface is electrically connected to the microprocessor unit and is used for accessing the second storage unit, wherein the second storage unit comprises a multi-layer structure for recording data. The memory management unit is electrically connected to the microprocessor unit and is used for managing the first storage unit and the second storage unit, wherein the memory management unit identifies the first storage unit and the second storage unit, sets the first storage unit as a master storage device and sets the second storage unit as a slave storage device according to the identification information.

The present invention provides a controller module suitable for a first storage unit and a second storage unit, wherein the controller module includes a host connecting interface, a first control unit, and a second control unit. The host connecting interface is coupled to a host unit. The first control unit has a master non-volatile memory interface electrically connected to the first storage unit, wherein the first storage unit comprises a single-layer structure for recording data. The second control unit has a slave non-volatile memory interface electrically connected to the second storage unit, wherein the second storage unit comprises a multi-layer structure for recording data. Accordingly, the first control unit and the second control unit respectively set the first storage unit as a master storage device and the second storage unit as a slave storage device according to identification information.

According to an embodiment of the present invention, the first storage unit is a SLC flash memory, and the second storage unit is a MLC flash memory.

The present invention provides a controller module, which includes a host connecting interface, a first storage unit, a first control unit, and a second control unit. The host connecting interface is coupled to a host unit. The first storage unit comprises a single-layer structure for recording data. The first control unit has a master non-volatile memory interface electrically connected to the first storage unit. The second control unit has a slave non-volatile memory interface electrically connected to an external second storage unit, wherein the second storage unit comprises a multi-layer structure for recording data. Accordingly, the first control unit and the second control unit respectively set the first storage unit as a master storage device and the second storage unit as a slave storage device according to identification information.

According to an embodiment of the present invention, the first storage unit is a SLC flash memory, and the second storage unit is a MLC flash memory.

In the present invention, an independent controller is disposed between storage devices and a host so that when the host is in operation or a storage device is connected to the host, the type of the storage device is automatically detected and the storage device is set correspondingly at the host. Thereby, when data is to be written, the data can be stored in an appropriate storage device according to the attribute of the data. As a result, the efficiency in data access can be improved and the hardware cost can be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
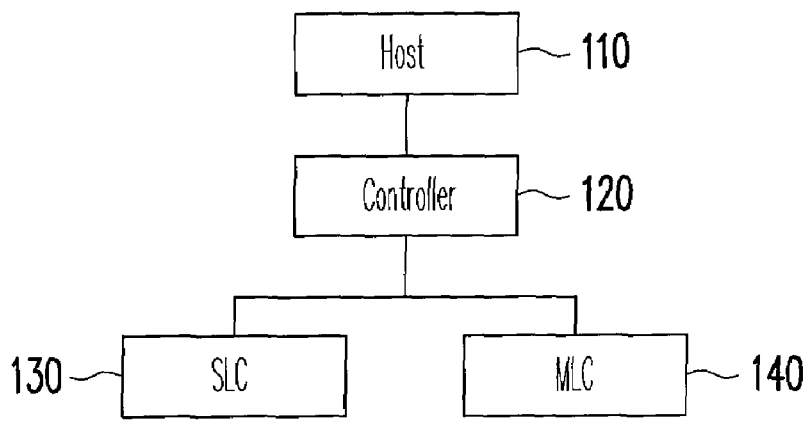
FIG. 1 is a block diagram of a data storage system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the present invention, a specific code is respectively set regarding a single level cell (SLC) NAND flash memory (referred as SLC thereinafter) and a multi level cell (MLC) NAND flash memory (referred as MLC thereinafter) according to the specifications of the interfaces being used, so as to allow a host to identify a master storage device and a slave storage device and accordingly recognize the SLC and the MLC as two independent storage devices when the host handshakes with the SLC and the MLC, in which the host is a specific processor. Additionally, in the present invention, when the SLC and the MLC are connected to the host, response messages are issued by an independent controller so as to notify the host about the identities of the SLC and the MLC and allow the host to set the SLC and the MLC as two independent storage devices. The present invention provides a data storage system and a method thereof based on foregoing concepts. Below, embodiments of the present invention will be described with reference to accompanying drawings.

FIG. 1 is a block diagram of a data storage system according to an embodiment of the present invention. Referring to FIG. 1, in the present embodiment, the data storage system includes a controller 120 and two storage units SLC 130 and MLC 140. Programming of blocks in the MLC NAND flash can be divided into multiple phases. For example, taking the programming of a 4-level cell as example, the lower page thereof is written during the first phase, and the physical characteristic thereof is similar to a SLC NAND flash memory. The upper page thereof is programmed after the first phase is completed. The writing speed of the lower page is faster than that of the upper page. Thus, pages in each block can be categorized into upper pages and lower pages. Similarly, in an 8-level cell or a 16-level cell, more pages are included and the writing of the memory cell can be divided into more phases. Here those pages having the fastest writing speed are referred as the lower pages, and the other pages having slower writing speeds are referred as the upper pages. For example, the upper pages may include a plurality of pages having different writing speeds.

Additionally, the controller 120 is disposed between the SLC 130, the MLC 140, and a host 110 and controls the host 110 to set the SLC 130 and the MLC 140 as two independent storage devices. Functions of foregoing elements will be described below.

The SLC 130 comprises a single-layer structure for recording data and offers fast speed and low power consumption such that it can be used for storing important and frequently accessed operating system (OS) information. The MLC 140 comprises a multi-layer structure for recording data and offers low cost such that it can be used for storing data files which are less updated and in large quantity. It should be mentioned that the SLC 130 and the MLC 140 in the present embodiment are physically independent devices.

The controller 120 is respectively coupled to the SLC 130, the MLC 140, and the host 110 for notifying the host 110 that the SLC 130 is a master storage device and the MLC 140 is a slave storage device. To be specific, the controller 120 is connected to the host 110 through a parallel advanced technology attachment (PATA) interface or a serial advanced technology attachment (SATA) interface and defines a proprietary command or a vendor specific command according to the specifications of these interfaces, so that when the host 110 is in operation or a storage device is connected to the host 110, the controller 120 responds the host 110 with one of the two commands to allow the host 110 to identify which device is the master storage device and which device is the slave storage device, wherein the controller 120 sets the SLC 130 as a master storage device and the MLC 140 as a slave storage device in advance.

Through the coordination of the controller 120, the host 110 can identify the types of solid state storage devices connected thereto and recognize them as two independent storage devices for storing data. In addition, the controller 120 can also identify the type of data transmitted by the host and send the data to an appropriate storage unit accordingly. This can be done by the controller by determining whether to send the data to the master storage device or the slave storage device according to the data efficiency or a particular algorithm, such as LRU, additional-reference-bits, second-chance algorithm, and page buffering algorithm. To be specific, when the data is identified as a frequently accessed data, such as OS information or data marked to send to the master storage device, the controller 120 sends the data to the SLC 130, and when the data is identified as general data files or data marked to send to the slave storage device, the controller 120 sends the data to the MLC 140.

It should be mentioned that through the data storage system in the present invention, the host 110 can recognize the SLC 130 and the MLC 140 as two independent storage devices so that when a user is about to store data, the data can be stored in an appropriate storage device according to the actual requirement. As a result, the process for storing data is simplified. Foregoing operating system may be Windows or Linux etc.

Figure 2:
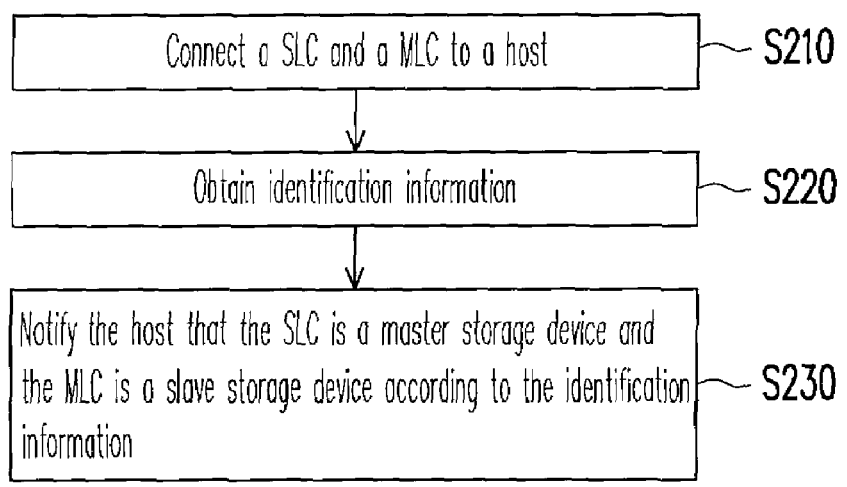
FIG. 2 is a flowchart of a data storage method according to an embodiment of the present invention.

The data transmission flow in foregoing data storage system will be described with reference to an embodiment of the present invention. FIG. 2 is a flowchart of a data storage method according to an embodiment of the present invention. Referring to FIG. 2, the data storage method of the present embodiment is suitable for the data storage system described in foregoing embodiment to store data into a SLC and a MLC, wherein the SLC comprises a single-layer structure for recording data, and the MLC comprises a multi-layer structure for storing data. Steps of the data storage method of the present embodiment will be described in detail below.

First, the SLC and the MLC are connected to a host (step S210). The connections between foregoing elements may be referred to the block diagram of the data storage system illustrated in FIG. 1, wherein the SLC and the MLC are connected to the controller and the controller is connected to the host through a PATA interface or a SATA interface, and accordingly, the SLC and the MLC are connected to the host.

Next, the position for storing the data is determined by the controller. To be specific, the controller first obtains identification information (step S220), wherein the identification information can be obtained according to a voltage level of a specific pin or the system information of a SLC or a MLC electrically connected to the controller (step S220). After that, the controller sets the master storage device and the slave storage device according to the identification information and notifies the host that the SLC is the master storage device and the MLC is the slave storage device (step S230). The controller may control the host to identify the master storage device and the slave storage device by responding the host with a proprietary command or a vendor specific command and send the data to the SLC and the MLC coupled thereto. Accordingly, the host can indirectly identifies the SLC and the MLC and recognize the two as two independent storage devices for storing data.

It should be mentioned that because the host can recognize the SLC and the MLC as two independent storage devices (for example, drive C and drive D), when a user is about to store data, an appropriate storage device can be selected according to the attribute of the data, or instead, the type of the data can be identified by the controller in order to send the data to the appropriate storage device. When the data is identified as a first type of data, such as OS information or data marked to send to the master storage device, the data is sent to the SLC (for example, the drive C), and when the data is identified as a second type of data, such as general data files or data marked to send to the slave storage device, the data is sent to the MLC (for example, the drive D). Thereby, the process for storing data is optimized.

Besides identifying the storage devices and controlling the host to set the storage devices by using a single controller, the present invention also includes disposing a controller corresponding to each storage device, so as to achieve the same effect of recognizing the SLC and MLC as two independent storage devices. This will be described below with reference to an embodiment of the present invention.

Figure 3:
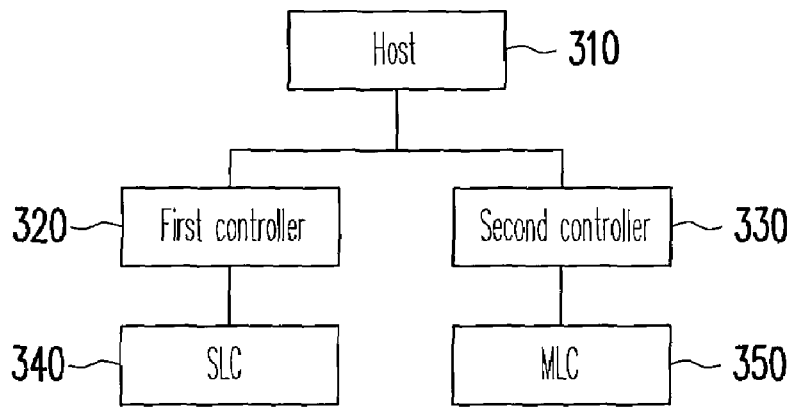
FIG. 3 is a block diagram of a data storage system according to an embodiment of the present invention.

FIG. 3 is a block diagram of a data storage system according to an embodiment of the present invention. Referring to FIG. 3, in the present embodiment, the data storage system includes a first controller 320, a second controller 330, and two storage units SLC 340 and MLC 350. The first controller 320 is disposed between the SLC 340 and a host 310, and the second controller 330 is disposed between the MLC 350 and the host 310. Functions of foregoing elements will be described below.

The SLC 340 comprises a single-layer structure for recording data and offers fast speed and low power consumption such that it can be used for storing important and frequently accessed OS information. The MLC 350 comprises a multi-layer structure for recording data and offers low fabrication cost such that it can be used for storing data files which are less updated and in large quantity. In the present embodiment, the SLC 340 and the MLC 350 are physically independent devices.

The first controller 320 is coupled to the SLC 340 and the host 310 for controlling the host 310 to set the SLC 340 as a master storage device. To be specific, the first controller 320 is connected to the host 310 through a PATA interface or a SATA interface and defines a proprietary command or a vendor specific command based on the specifications of these interfaces, so that when the host 310 is in operation or a storage device is connected to the host 310, the first controller 320 responds the host 310 with one of foregoing commands so as to notify the host 310 that the SLC 340 is a master storage device.

The second controller 330 is coupled to the MLC 350 and the host 310 for notifying the host 310 that the MLC 350 is a slave storage device. To be specific, the second controller 330 is connected to the host 310 through a PATA interface or a SATA interface and also defines a proprietary command or a vendor specific command based on the specifications of these interfaces, so that when the host 310 is in operation or a storage device is connected to the host 310, the second controller 330 responds the host 310 with one of foregoing commands so as to notify the host 310 that the MLC 350 is a slave storage device.

It should be noted that the first controller 320 and the second controller 330 may also identify a storage device coupled thereto as a SLC or a MLC based on the system information provided by the storage device and accordingly set the storage device as a master storage device or a slave storage device.

Based on foregoing structure that a controller is disposed corresponding to each storage device, the host 310 can identity the types of solid state storage devices coupled thereto and recognize the storage devices as independent storage devices for accessing data. It should be mentioned that in the present invention, the number of solid state storage devices connected to the host 310 is not limited, and a plurality of SLCs or MLCs can be connected to the host and set as independent storage devices by the host according to the actual requirement.

On the other hand, the first controller 320 and the second controller 330 may also be used for identifying the type of data transmitted by the host so as to send the data to appropriate storage units. To be specific, when the data is identified frequently accessed data such as OS information or data marked to send to the master storage device, the first controller 320 sends the data to the SLC 340, and meanwhile the second controller 330 does not send the data to the MLC 350. Contrarily, when the data is identified as general data files or data marked to send to the slave storage device, the second controller 330 sends the data to the MLC 350, and meanwhile the first controller 320 does not send the data to the SLC 340. This may also be carried out by the controller to determine whether to send the data to the master storage device or the slave storage device according to the data efficiency or a particular algorithm, such as LRU, additional-reference-bits, second-chance algorithm, and page buffering algorithm.

It should be mentioned that through the data storage system of the present invention, the host 310 can recognize the SLC 340 and the MLC 350 as two independent storage devices, so that when a user is about to store data, the data can be stored into an appropriate storage device (this includes storing the OS information into the SLC 340 and storing general data files into the MLC 350). As a result, the process for storing data is simplified.

Figure 4:
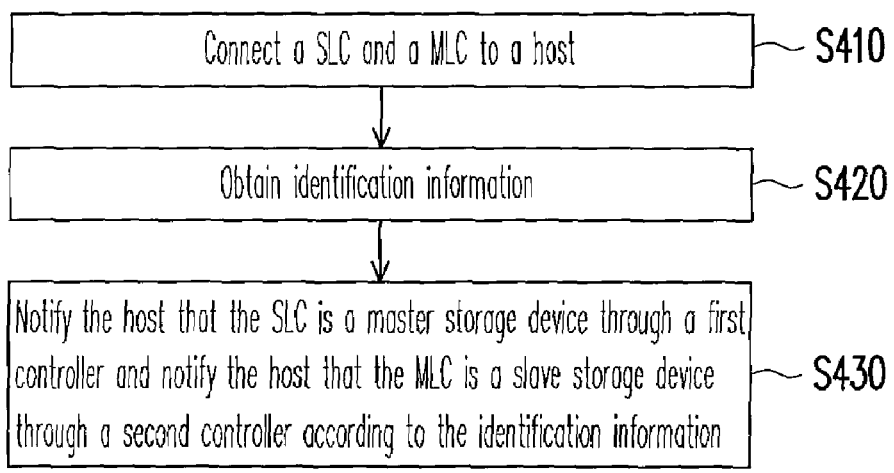
FIG. 4 is a flowchart of a data storage method according to an embodiment of the present invention.

The data transmission flow in foregoing data storage system will be described with reference to an embodiment of the present invention. FIG. 4 is a flowchart of a data storage method according to an embodiment of the present invention. Referring to FIG. 4, the data storage method in the present embodiment is suitable for the data storage system in foregoing embodiment to store data into a SLC and a MLC, wherein the SLC comprises a single-layer structure for recording data, and the MLC comprises a multi-layer structure for recording data. The steps of the data storage method in the present embodiment will be described in detail below.

First, the SLC and the MLC are connected to the host (step S410), and the connections of foregoing elements may be referred to the block diagram of the data storage system illustrated in FIG. 3, in which the SLC is connected to the first controller, and the first controller is connected to the host through a PATA interface or a SATA interface, and accordingly the SLC is connected to the host. On the other hand, the MLC is connected to the second controller, and the second controller is connected to the host through a PATA interface or a SATA interface, and accordingly the MLC is connected to the host.

Next, identification information is obtained through a first controller and a second controller (step S420). After that, the first controller indirectly notifies the host that the SLC is a master storage device according to the identification information, and the second controller indirectly notifies the host that the MLC is a slave storage device according to the identification information (step S430). To be specific, the first controller and the second controller may set the storage devices coupled thereto as a master storage device or a slave storage by detecting the voltage level on a pin, or the first controller and the second controller may identify the storage devices coupled thereto as a SLC or a MLC according to the system information provided by the storage devices and then set the storage devices as a master storage device or a slave storage device. Then the first controller and the second controller respond the host with a proprietary command or a vendor specific command to notify the host about which device is the master storage device and which device is the slave storage device. Accordingly, the host can indirectly identify the SLC and the MLC and recognize the two as two independent storage devices for storing data.

It should be mentioned that since the host can identify the SLC and the MLC as two independent storage devices, when a user is about to store data, an appropriate storage device can be selected for storing the data according to the attribute of the data, or the type of the data can be identified directly by the controller so as to store the data into the appropriate storage device. When the data is identified as OS information or data marked to send to the master storage device, the controller sends the data to the SLC, and when the data is identified as general data files or data marked to send to the slave storage device, the controller sends the data to the MLC. As a result, the process for storing data is optimized.

Based on foregoing structure where a controller is disposed corresponding to each storage device, the present invention further includes integrating or assembling the first controller and the second controller into an independent apparatus, or integrating or assembling the first controller, the second controller, and the SLC into an independent apparatus in order to reduce hardware cost. These situations will be respectively described with reference to an embodiment of the present invention.

Figure 5:
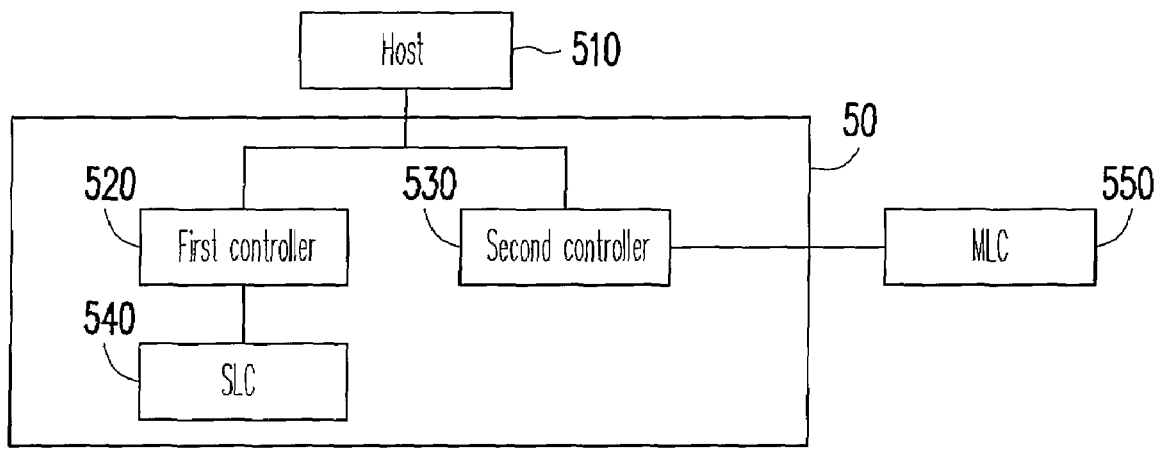
FIG. 5 is a block diagram of a data storage system according to an embodiment of the present invention.

FIG. 5 is a block diagram of a data storage system according to an embodiment of the present invention. Referring to FIG. 5, in the present embodiment, the data storage system includes a first controller 520, a second controller 530, a SLC 540, and a MLC 550. The connections and functions of foregoing elements are the same as or similar to those of the host 310, the first controller 320, the second controller 330, the SLC 340, and the MLC 350 described in foregoing embodiment, and therefore will not be described herein. It should be noted that in the present embodiment, the first controller 520, the second controller 530, and the SLC 540 are integrated or assembled into an independent apparatus 50, and the MLC 550 is disposed independently. The advantages of such a structure is that since the MLC 550 has low cost and short lifespan, the cost for disposing a controller on each MLC 550 is reduced and the flexibility in changing the MLC 550 is improved when the second controller 530 is integrated with the SLC 540.

Figure 6:
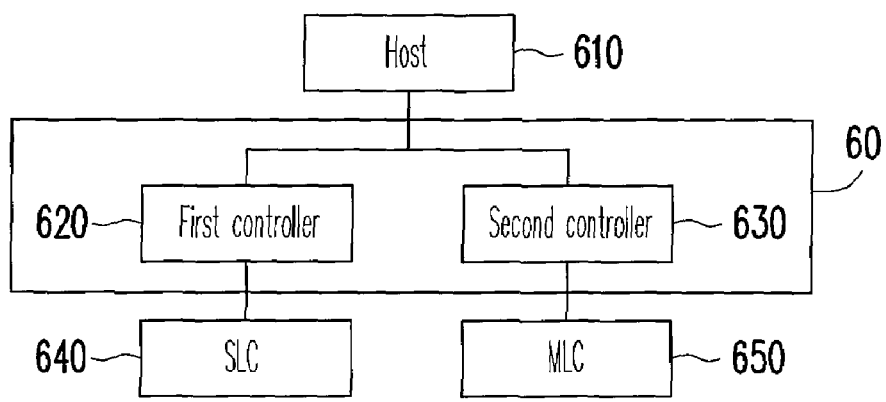
FIG. 6 is a block diagram of a data storage system according to an embodiment of the present invention.

FIG. 6 is a block diagram of a data storage system according to an embodiment of the present invention. Referring to FIG. 6, in the present embodiment, the data storage system includes a first controller 620, a second controller 630, a SLC 640, and a MLC 650. The connections and functions of foregoing elements are the same as or similar to those of the host 310, the first controller 320, the second controller 330, the SLC 340, and the MLC 350 described in foregoing embodiment, and therefore will not be described herein. It should be noted that in the present embodiment, the first controller 520 and the second controller 530 are integrated or assembled into an independent apparatus 60, and the SLC 540 and the MLC 550 are still disposed independently. The advantage of such a structure is that the user needs only to purchase the apparatus 60 and install it on a host so as to change the SLC 540 and the MLC 550 flexibly according to the actual requirement. It is not necessary to pay for a controller even when the SLC 540 or the MLC 550 is broken and needs to be changed. Accordingly, the manufacturing cost of the product is reduced and the flexibility in using the product is improved.

It should be noted that the SLC and the MLC in foregoing embodiments are physically independent devices. However, presently, a structure for disposing both a SLC and a MLC in a single apparatus has been provided. Thus, a solution corresponding to such a structure is also provided by the present invention, in which after this apparatus is connected to a host, the host can still recognize the SLC and the MLC in the apparatus as two independent storage devices for storing data. This will be described below with reference to an embodiment of the present invention.

Figure 7:
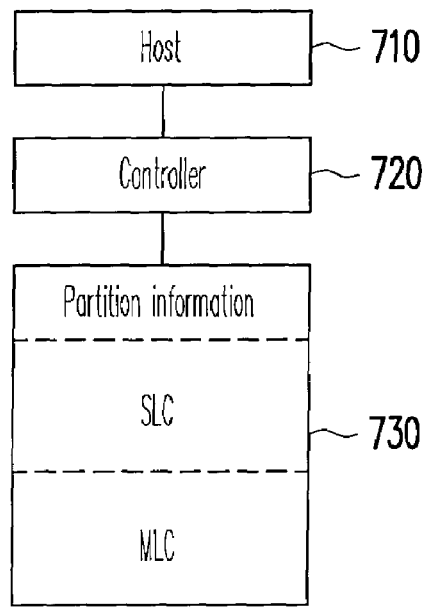
FIG. 7 is a block diagram of a data storage system according to an embodiment of the present invention.

FIG. 7 is a block diagram of data storage system according to an embodiment of the present invention. Referring to FIG. 7, in the present embodiment, the data storage system includes a controller 720 and a storage device 730. The controller 720 is disposed between a host 710 and the storage device 730 for notifying the host 710 that the SLC and the MLC are two independent storage devices. The functions of foregoing elements will be described below.

The storage device 730 may be a section divided from a MLC flash memory. This section uses only the lower pages for storing data and accordingly is simulated as a SLC. The simulated SLC is located in a first logic address section of the storage device 730, and the other sections which use both the lower pages and the upper pages for storing data are used as general MLCs and are located in a second logic address section of the storage device 730. Partition information of the first logic address section and the second logic address section is recorded in a partition information block of the storage device 730, such as a partition data in the master boot record (MBR), when the storage device 730 is partitioned,.

The controller 720 reads the information of the first logic address section and the second logic address section from the partition information block of the storage device 730 so as to control the host 710 to set the first logic address section (i.e. the simulated SLC portion) of the storage device 730 as a master storage device and sets the second logic address section (i.e. the MLC portion) of the storage device 730 as a slave storage device.

It should be mentioned that the controller 720 is connected to the host 710 through a PATA interface or a SATA interface and defines a proprietary command or a vendor specific command based on the specifications of these interfaces, so that when the host 710 is in operation or the storage device 730 is connected to the host 710, the controller 720 responds the host 710 with one of foregoing commands so as to notify the host 710 that the SLC and MLC portions in the storage device 730 are respectively a master storage device and a slave storage device.

It should be mentioned that through the data storage system in the present invention, the host 710 can recognize the SLC and MLC portions of the storage device 730 as two independent storage devices. Accordingly, when a user is about to store data, the data can be stored into an appropriate storage device (this includes storing OS information or data marked to send to the master storage device into the SLC and storing general data files or data marked to send to the slave storage device into the MLC) according to the actual requirement. As a result, the process for storing data is simplified.

Figure 8:
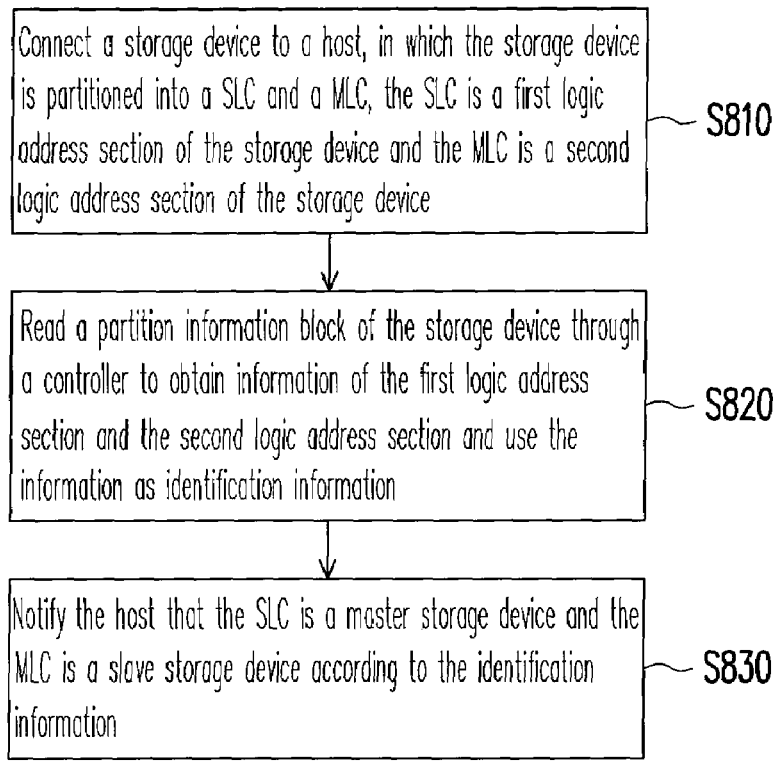
FIG. 8 is a flowchart of a data storage method according to an embodiment of the present invention.

The data transmission flow of foregoing data storage system will be described below with reference to an embodiment of the present invention. FIG. 8 is a flowchart of a data storage method according to an embodiment of the present invention. Referring to FIG. 8, the data storage method in the present embodiment is suitable for the data storage system described in foregoing embodiment to store data into the SLC and MLC portions of a single storage device. Steps of the data storage method in the present embodiment will be described below.

First, the storage device is connected to a host (step S810). The storage device is partitioned into a SLC portion and a MLC portion, wherein the SLC portion is located in a first logic address section of the storage device, and the MLC portion is located in a second logic address section of the storage device.

Next, the controller reads a partition information block of the storage device to obtain information of the first logic address section and the second logic address section and use the information as the identification information (step S820).

Finally, the controller notifies the host according to the identification information that the SLC portion of the storage device is a master storage device and the MLC portion of the storage device is a slave storage device (step S830), wherein the controller notifies the host by responding the host with a proprietary command or a vendor specific command. Accordingly, the host can indirectly identifies the SLC and MLC portions of the storage device and recognize them as two independent storage devices for storing data.

It should be mentioned that since the host can recognize the SLC and MLC portions of the storage device as two independent storage devices, when data is to be stored, an appropriate storage device can be selected for storing the data according to the attribute of the data, or the controller can identify the type of the data so as to store the data into the appropriate storage device. When the data is identified as OS information or data marked to send to the master storage device, the controller sends the data to the SLC portion of the storage device, and when the data is identified as general data files or data marked to send to the slave storage device, the controller sends the data to the MLC portion of the storage device. As a result, the process for storing data is optimized.

Additionally, it should be mentioned that in foregoing embodiments of the present invention, a partition information block in the MLC or the SLC (for example, a partition data in a MBR) may be further write protected so as to prevent the flash memory from being formatted. To be specific, the write protection function can be implemented as responding a failure message when the controller receives a command for writing into a logic block address (LBA) corresponding to the MBR, or refusing to write the data when the controller detects that the data is to be written into the partition information block.

In overview, according to the data storage system and method provided by the present invention, an independent controller is disposed between a host and storage devices so that when the host is in operation or a storage device is connected to the host, the controller can control the host to identify the types of the storage devices and recognize the SLC and the MLC as two independent storage devices for storing data. As a result, the process for storing data is simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data storage system, comprising:
   a first storage unit comprising a single-layer structure for recording data;
   a second storage unit comprising a multi-layer structure for recording data; and
   a controller coupled to the first storage unit, the second storage unit, and a host, the controller informing the host that the first storage unit is a master storage device and informing the host that the second storage unit is a slave storage device when the host is in operation, wherein the first storage unit and the second storage unit are formed by partitioning a storage device, and the storage device is a multi-layer cell (MLC) flash memory; wherein the first storage unit is a first logic address section of the storage device, and the second storage unit is a second logic address section of the storage device; and wherein the first logic address section uses only lower pages for storing data, and the second logic address section uses both lower pages and upper pages for storing data.

2. The data storage system according to claim 1, wherein the controller responds the host with one of a proprietary command and a vendor specific command to allow the host to identify the first storage unit and the second storage unit.

3. The data storage system according to claim 1, wherein the first storage unit and the second storage unit respectively store system information, and the controller identifies the storage structure type of the storage device according to the system information provided thereby and accordingly sets the storage device as the master storage device or the slave storage device.

4. The data storage system according to claim 1, wherein the controller further receives and identifies data transmitted by the host, wherein when the data is identified as a first type of data, the controller sends the data to the first storage unit, and when the data is identified as a second type of data, the controller sends the data to the second storage unit.

5. The data storage system according to claim 4, wherein the first type of data comprises operating system (OS) information, and the second type of data comprises data files.

6. The data storage system according to claim 4, wherein the first type of data comprises data marked to send to the master storage device, and the second type of data comprises data marked to send to the slave storage device.

7. The data storage system according to claim 1, wherein the controller reads information of the first logic address section and the second logic address section when the host is in operation and sets the first logic address section of the storage device as the master storage device and the second logic address section of the storage device as the slave storage device according to the information.

8. The data storage system according to claim 1, wherein the controller is connected to the host through one of a parallel advanced technology attachment (PATA) interface and a serial advanced technology attachment (SATA) interface.

9. The data storage system according to claim 1, wherein a partition information block in the first storage unit and the second storage unit is write protected.

10. The data storage system according to claim 1, wherein the first storage unit and the second storage unit are integrated into or packaged as an apparatus.

11. A data storage system, comprising:
    a first storage unit comprising a single-layer structure for recording data;
    a second storage unit comprising a multi-layer structure for recording data;
    a first controller coupled to the first storage unit and a host for setting the first storage unit as a master storage device; and
    a second controller coupled to the second storage unit and the host for setting the second storage unit as a slave storage device,
    wherein the first storage unit and the second storage unit are both MLC flash memories, the first storage unit uses only lower pages for storing data, and the second storage unit users both lower pages and upper pages for storing data.

12. The data storage system according to claim 11, wherein the first controller and the second controller respond the host with one of a proprietary command and a vendor specific command, so as to allow the host to identify the first storage unit and the second storage unit.

13. The data storage system according to claim 11, wherein the first controller further receives and identifies data transmitted by the host, wherein when the data is identified as a first type of data, the first controller sends the data to the first storage unit.

14. The data storage system according to claim 13, wherein the second controller receives and identifies the data transmitted by the host, wherein when the data is identified as a second type of data, the second controller sends the data to the second storage unit.

15. The data storage system according to claim 14, wherein the first type of data comprises OS information, and the second type of data comprises data files.

16. The data storage system according to claim 14, wherein the first type of data comprises data marked to send to the master storage device, and the second type of data comprises data marked to send to the slave storage device.

17. The data storage system according to claim 11, wherein the first controller and the second controller are connected to the host through one of a PATA interface and a SATA interface.

18. A data storage method, suitable for storing data to a first storage unit or a second storage unit, wherein the first storage unit comprises a single-layer structure for recording data, and the second storage unit comprises a multi-layer structure for storing data, the data storage method comprising:
    connecting the first storage unit and the second storage unit to a host;
    identifying the first storage unit and the second storage unit by using a controller so as to obtain identification information;
    setting the first storage unit as a master storage device and the second storage unit as a slave storage device according to the identification information; and
    responding the host with one of a proprietary command and a vendor specific command, so as to allow the host to identify the first storage unit and the second storage unit.

19. The data storage method according to claim 18, wherein the identification information refers to that the controller identifies the storage structure type of the storage device and accordingly sets a storage device having the single-layer structure as the master storage device and sets a storage device having the multi-layer structure as the slave storage device.

20. The data storage method according to claim 18 further comprising:
   receiving data transmitted by the host by using the controller; and
   identifying the type of the data by using the controller so as to transmit the data according to the type of the data, wherein
   when the controller identifies the data as a first type of data, the controller sends the data to the first storage unit, when the controller identifies the data as a second type of data, the controller sends the data to the second storage unit.

21. The data storage method according to claim 18, wherein the first type of data comprises OS information, and the second type of data comprises data files.

* * * * *